(No Model.)

A. A. KENT & R. J. MILLER.
FRUIT TREE PROTECTOR.

No. 574,998. Patented Jan. 12, 1897.

Witnesses.
L. C. Whitted
J. D. Mouck.

Inventors.
Alfred A. Kent
Rob't J. Miller

UNITED STATES PATENT OFFICE.

ALFRED A. KENT AND ROBERT J. MILLER, OF LENOIR, NORTH CAROLINA.

FRUIT-TREE PROTECTOR.

SPECIFICATION forming part of Letters Patent No. 574,998, dated January 12, 1897.

Application filed February 17, 1896. Serial No. 579,573. (No model.)

*To all whom it may concern:*

Be it known that we, ALFRED A. KENT and ROBERT J. MILLER, citizens of the United States, residing at Lenoir, in the county of Caldwell and State of North Carolina, have invented a new and useful Fruit-Tree Protector for Use upon Fruit-Trees, Vines, and other Trees, of which the following is a specification.

Our invention relates to the protection of fruit-trees, vines, and other trees against all such vermin and insect pests as the root-borer of the peach-tree; against such rodents as hares, rats, and mice; against severe cold of winter and heat and sunshine of summer; against the injury and killing of the fruit-crop by the late frosts of spring; to serve as a permanent rack or support for holding up grape and other vines, and to protect against all kinds of mechanical injury. We attain these several objects by the device illustrated in the accompanying drawings.

Figure 1:
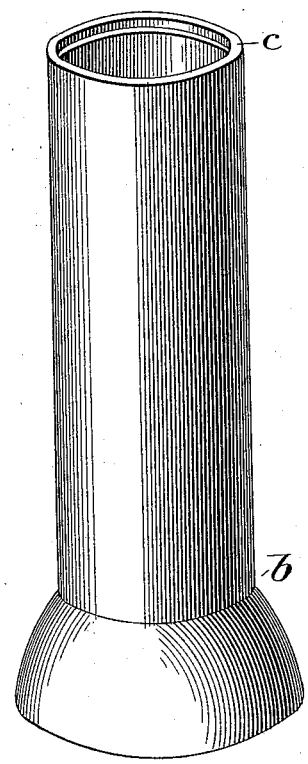
Figure 3:
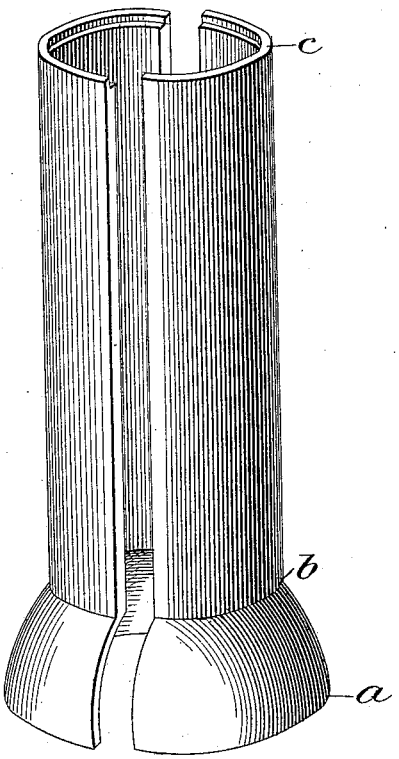
Figure 2:
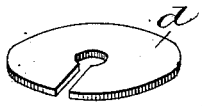

Figure 1 is an exterior view of the device or protector. Fig. 2 represents the lid or cover to be used with the protector. Fig. 3 is a view of the protector when made of two lateral parts, the two parts being separate.

Fig. 1 represents a hollow cylindrical pipe to be made of different heights and diameters, straight or curved, as needed, to be made of clay burned and glazed, or other durable material, to be made in a single piece, bell-shaped at one end $a$ to $b$, of smaller diameter from $b$ to $c$, the interior diameter at $c$ increased and shouldered to receive and hold in place the lid or cover. This hollow pipe when in use upon the tree or vine will stand upright, the end at $a$ resting upon the soil two inches or more below the surface of the soil, the bell-shaped part $a$ to $b$ incasing the enlarged trunk of the tree at that point, the smaller part $b$ to $c$ incasing the trunk above the enlargement, the lid, Fig. 2, when such is desired, to be adjusted around the tree and into the pipe at $c$ to complete the case.

Fig. 2 represents the lid or cover, to be made in a single piece of some flexible material such as rubber belting, circular in form, with a central aperture and a slit or cleft from the circumference to the central aperture, so that it may be adjusted to the tree and into the top of the pipe at $c$.

Fig. 3 represents the protector, to be made of the same material and shape as Fig. 1. Before it is burned and glazed it is partially severed into two lateral parts by a direct cut down two opposite sides the entire length of the pipe from $c$ to $a$. The cuts extend only partly through the thickness of the wall, leaving part of the wall or thickness uncut, to hold it together in burning and glazing. After it is burned and glazed it is broken apart in line with the cuts, making two lateral parts. These two parts when brought together in use around the tree are held together by means of two wire bands, the two parts again making the hollow pipe bell-shaped at one end, as described in the protector made in a single piece.

The manner of use of our protector for the several purposes is obvious, except for protecting trees against the cold of winter and to protect the fruit-crop from injury by the late frosts of spring. The object of our invention is to incase the trunk of the tree in a hollow device made of a poor conductor of heat, leaving considerable space around the trunk of the tree inside of the device. This space may be filled with earth or other material to further protect the tree against the cold of winter. To protect the fruit-crop from injury by late frosts, this hollow space around the tree is packed in midwinter with ice and sawdust or other like material. The protector being a poor conductor of heat, this cold zone is retained around the trunk of the tree and retards the blooming of the tree till after the late frosts of spring.

What we claim, and desire to secure by Letters Patent, is—

1. A manufactured device made of clay burned and glazed or other durable material, in shape of a hollow pipe, one end enlarged in bell shape, combined with a lid made in a single piece with a central aperture and a slit from the circumference to the central aperture.

2. A manufactured device made as herein described, consisting of two lateral parts, which, being brought together and so held, form a hollow pipe bell-shaped at one end, of smaller diameter above, shouldered at the other end, to receive and retain the lid, combined with a lid made of a single piece &c. as described.

3. A manufactured device made as described, combined with a cold interior fill or packing composed of ice and sawdust, or other materials making a cold zone around the trunk of the tree in the hollow space of the pipe.

ALFRED A. KENT.
ROBT. J. MILLER.

Witnesses:
JNO. W. KIRBY,
G. W. CONLEY.